United States Patent [19]
Gildea

[11] Patent Number: 5,854,605
[45] Date of Patent: Dec. 29, 1998

[54] GPS RECEIVER USING DATA BIT TIMING TO ACHIEVE A FAST TIME TO FIRST FIX

[75] Inventor: David R. Gildea, Menlo Park, Calif.

[73] Assignee: Trimble Navigation Limited, Sunnyvale, Calif.

[21] Appl. No.: 678,573

[22] Filed: Jul. 5, 1996

[51] Int. Cl.$^6$ ............................ G01S 5/02; H04B 7/185
[52] U.S. Cl. ..................... 342/357; 342/352; 701/213
[58] Field of Search ................... 342/352, 357, 342/386; 701/213

[56] References Cited

U.S. PATENT DOCUMENTS

| | | | |
|---|---|---|---|
| 4,423,419 | 12/1983 | Johannessen | 343/387 |
| 5,390,207 | 2/1995 | Fenton et al. | 375/1 |
| 5,402,450 | 3/1995 | Lennen | 375/343 |
| 5,592,173 | 1/1997 | Lan et al. | 342/357 |
| 5,594,453 | 1/1997 | Rodal et al. | 342/357 |
| 5,629,708 | 5/1997 | Rodal et al. | 342/357 |

*Primary Examiner*—Thomas H. Tarcza
*Assistant Examiner*—Dao L. Phan
*Attorney, Agent, or Firm*—David R. Gildea

[57] ABSTRACT

A GPS receiver and a method for improving time to first fix (TTFF). The GPS receiver includes an internal clock for maintaining an approximate clock time during a standby mode and a microprocessor system including a data bit timer code, a temperature compensation code, and a learned time adjustment code. When the GPS receiver enters an operational mode, the data bit timer code instructs the microprocessor system for determining a GPS-based clock time by aligning the approximate clock time according to a time-of-arrival of a GPS data bit when the approximate clock time and the GPS-based clock time are estimated to be within a correction range of ten milliseconds. The temperature compensation code and a learned time adjustment code include instructions for using a stored frequency/temperature characteristic and a learned time correction, respectively, for estimating and compensating for time drift that has occurred during the standby mode. A temperature sensor provides a temperature measurement of a reference oscillator used as a time base for the internal clock.

16 Claims, 6 Drawing Sheets

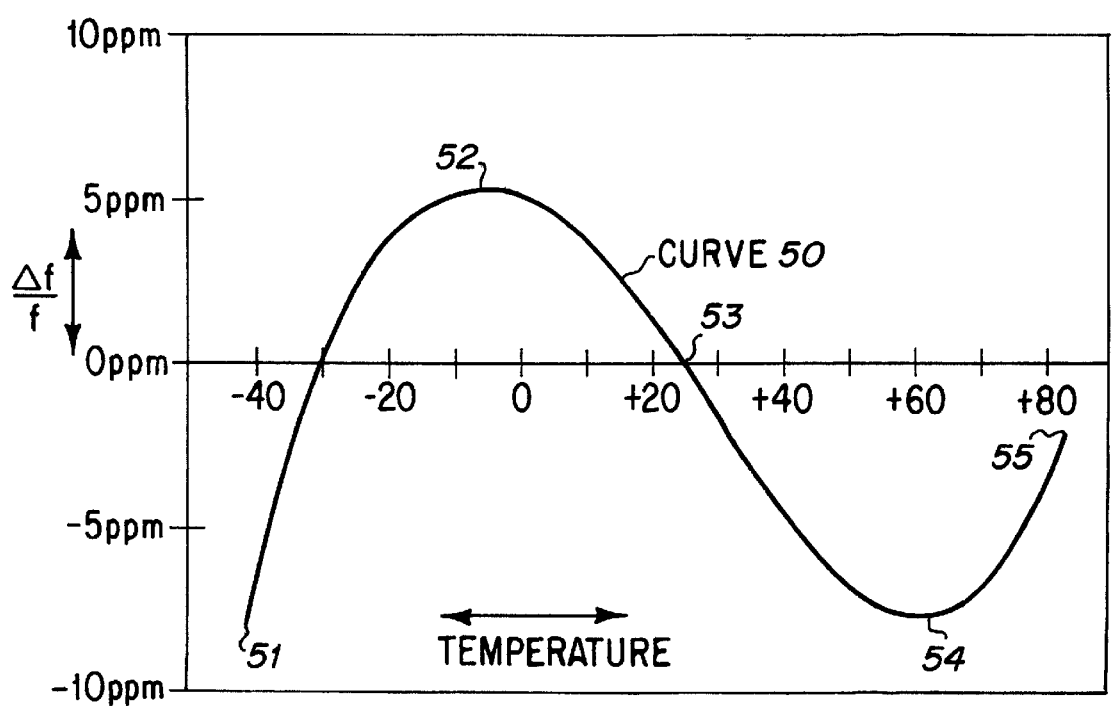
Fig_2A

TABLE FOR
FREQUENCY/TEMPERATURE RELATIONSHIP

| TEMPERATURE | FREQUENCY VARIATION IN PPM |
|---|---|
| -40 | -7.5 |
| -35 | -3.5 |
| -30 | -0.3 |
| -25 | 2.3 |
| -20 | 4.1 |
| -15 | 5.3 |
| -10 | 6 |
| -5 | 6.1 |
| 0 | 5.7 |
| 5 | 5 |
| 10 | 4 |
| 15 | 2.7 |
| 20 | 1.2 |
| 25 | -0.3 |
| 30 | -1.8 |
| 35 | -3.4 |
| 40 | -4.7 |
| 45 | -5.9 |
| 50 | -6.9 |
| 55 | -7.6 |
| 60 | -7.9 |
| 65 | -7.7 |
| 70 | -7.1 |
| 75 | -5.9 |
| 80 | -4.1 |
| 85 | -1.6 |

Fig. 2B

GPS RECEIVER USING DATA BIT TIMING TO ACHIEVE A FAST TIME TO FIRST FIX

BACKGROUND OF THE INVENTION

1. Field of the Invention

The invention relates generally to global positioning system (GPS) receivers and more particularly to a GPS receiver using GPS data bit timing for improving time to first fix (TTFF).

2. Description of the Prior Art

Global positioning system (GPS) receivers are used in many applications for providing a geographical location fix where a fast time to first fix (TTFF), defined as a time for the GPS receiver to provide a first geographical location fix after having been in a standby mode for hours or days, is desirable. To provide the location fix, the GPS receiver must first acquire a GPS satellite signal from one or more GPS satellites. The GPS satellite signal from each GPS satellite includes GPS data bits modulated by a distinct pseudorandom noise (PRN) code. The distinct PRN code enables the GPS receiver to distinguish the GPS satellite signal from one GPS satellite from the GPS satellite signal from another GPS satellite. The GPS data bits are organized into a frames of fifteen hundred bits. Each frame is subdivided into five subframes of three hundred bits each. All of the information needed for the GPS receiver to calculate its geographical location is included in the frame.

Typically, when the GPS receiver is first turned on, it knows its own approximate location, an almanac or ephemeris information for the locations-in-space of the GPS satellites as a function of clock time, and an approximate clock time. The GPS receiver processes the approximate time, its location, and the almanac or ephemeris information to determine which of the GPS satellites should be in-view and generates a GPS replica signal having a pseudorandom noise (PRN) code matching a PRN code of one or more of the in-view GPS satellites. The GPS satellite signal is then acquired by synchronizing (correlating) a frequency and a phase of the GPS replica signal to a frequency and a phase of the GPS satellite signal. When correlation is achieved the GPS receiver monitors the GPS data bits until a start of a subframe is recognized. When the start of the subframe is recognized, the GPS receiver reads the GPS data bits to learn a GPS-based clock time. A current precise location-in-space of-the GPS satellite is then calculated from the GPS-based clock time and the ephemeris information.

The GPS-based clock time is compared to the phase of the GPS replica signal to calculate a pseudorange from the location of the GPS receiver to the location-in-space of the GPS satellite. Typically, the ephemeris information is retained in memory in the GPS receiver from a previous operational mode or is determined by reading additional GPS data bits. The geographical location fix is derived by solving four simultaneous equations having the locations-in-space and the pseudoranges for four or more GPS satellites.

A limitation in the existing GPS receivers is that they must monitor the GPS data bits for about six seconds for a start of a subframe in order to determine the GPS-based clock time. The monitoring time may add significantly to the TTFF in certain situations. One solution for eliminating the monitoring time is to use an atomic clock as a time standard in the GPS receiver. However, atomic clocks are costly, large, and have a high power consumption. Another solution is disclosed by Eschenbach in U.S. Pat. No. 5,663,735 for a "GPS Receiver using a Radio Signal for Improving Time to First Fix" by receiving a relatively accurate clock time in a time standard signal is such as WWV. However, the radio receiver used by Eschenbach also adds to the cost, size, and power consumption of the GPS receiver.

What is needed is a GPS receiver and a method that does not add significantly to the cost, size, and power consumption of the GPS receiver for determining a GPS-based clock time without a requirement for monitoring the GPS data bits until a start of a subframe.

SUMMARY OF THE INVENTION

It is therefore an object of the present invention to provide a GPS receiver and a method for improving time to first fix (TTFF) without significantly increasing the cost, size, or power consumption of the GPS receiver by using a time-of-arrival of a GPS data bit to correct an approximate internal clock time for providing a GPS-based clock time.

Another object is to provide a GPS receiver and a method for estimating and compensating for an internal clock time drift that occurs during a standby mode.

Briefly, in a preferred embodiment, the present invention of a GPS receiver includes an internal clock for maintaining an approximate clock time during a standby mode and a microprocessor system including a data bit timer code, a temperature compensation code, and a learned time adjustment code. When the GPS receiver enters an operational mode, the data bit timer code instructs the microprocessor system for determining a GPS-based clock time by aligning the approximate clock time according to a time-of-arrival of a GPS data bit when the approximate clock time and the GPS-based clock time are estimated to be within a correction range of ten milliseconds. The temperature compensation code and a learned time adjustment code include instructions for using a stored frequency/temperature characteristic and a learned time correction, respectively, for estimating and compensating for time drift that has occurred during the standby mode. A temperature sensor provides a temperature measurement of a reference oscillator used as a time base for the internal clock.

An advantage of the GPS receiver of the present invention is that it improves TTFF without significantly increasing the cost, size, or power consumption of the GPS receiver by determining a GPS-based clock time without waiting until a start of a subframe.

Another advantage of the GPS receiver of the present invention is that it estimates and compensates for time drift that has occurred during a standby mode, thereby extending a time duration of the standby mode where an internal clock time is within a correction range for providing a GPS-based clock time.

These and other objects and advantages of the present invention will no doubt become obvious to those of ordinary skill in the art after having read the following detailed description of the preferred embodiments which are illustrated in the various figures.

IN THE DRAWINGS

FIGS. 2a and 2b are a curve and a table, respectively, of a frequency/temperature characteristic for a reference oscillator used in the GPS receiver of FIG. 1.

DETAILED DESCRIPTION OF THE PREFERRED EMBODIMENTS

Figure 1:
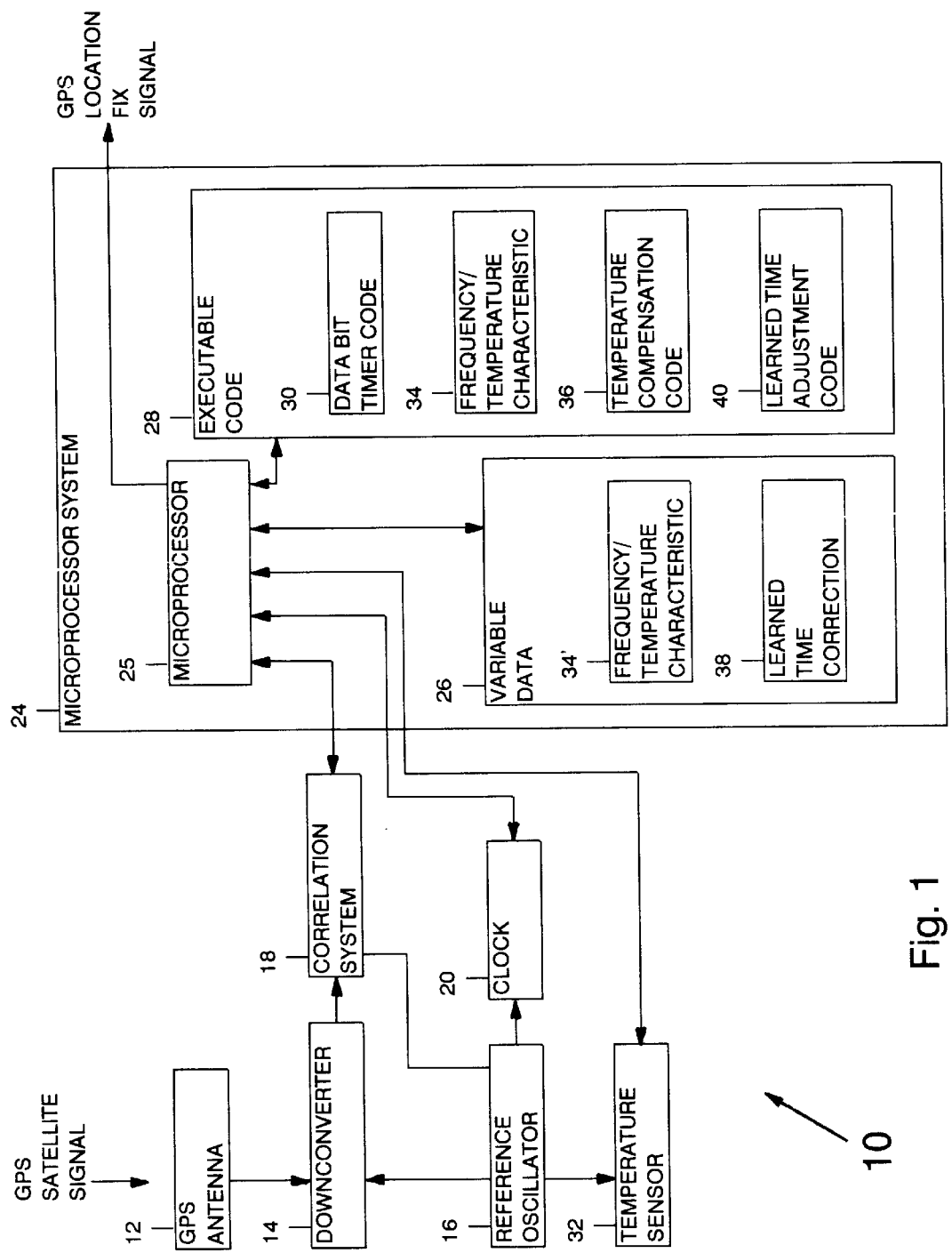
FIG. 1 is a block diagram of a GPS receiver of the present invention having a fast time to first fix (TTFF)

FIG. 1 is a block diagram of the present invention of a global positioning system (GPS) receiver referred to by the general reference number 10 and used for receiving a GPS satellite signal and determining a geographical location fix. The GPS satellite signal includes GPS data bits where each data bit is modulated by a pseudorandom noise (PRN) code sequence that is distinct for each GPS satellite. The GPS data bits are twenty milliseconds long and have a time-of-transmission from the GPS satellite of a GPS-based clock time of 00 hours, 00 minutes, 00 seconds, and 000 milliseconds and each twenty milliseconds thereafter each day. The PRN code sequence is one millisecond long and includes 1023 chips. Each GPS data bit is modulated by twenty PRN code sequences. Three hundred GPS data bits make up a subframe of six seconds length and five subframes make up a frame of thirty seconds length. The information needed by the GPS receiver 10 for providing a GPS based time and geographical location fix is repeated in each frame. Further details of the GPS satellite signal are described in "GPS Interface Control Document, ICD-GPS-200", reprinted February, 1995, and available from Navtech Seminars & Navtech Book and Software Store, Arlington, Va. which is incorporated herein by reference.

The GPS receiver 10 has an operational mode for acquiring the GPS satellite signal and providing a GPS-based geographical location and a low power standby mode. The GPS receiver 10 includes a GPS antenna 12, a downconverter 14, a reference oscillator 16, a correlation system 18, a clock 20, and a microprocessor system 24. The microprocessor system 24 includes a microprocessor 25; a microprocessor bus; a memory for storing variable data 26; a memory for storing an executable code 28; associated hardware for clocking, encoding, and gating signals, and input/output hardware for interfacing the microprocessor system 24 to the other elements of the GPS receiver 10. The microprocessor 25 operates in a conventional manner to receive signals over the bus, process the information in the signals according to the variable data 26 and instructions in the executable code 28, and to issue signals over the bus. The executable code 28 includes several programs (codes) that have been compiled together for instructing the microprocessor 25 for performing or directing other elements in the GPS receiver 10 for performing the functions of the GPS receiver 10. The executable code 28 and at least a part of the variable data 26 are retained in static memory such as electronically programmable read only memory (EPROM) and static random access memory (SRAM), respectively.

In the operational mode, the GPS antenna 12 receives an airwave GPS satellite signal and issues a responsive conducted GPS signal to the downconverter 14. The reference oscillator 16 provides a reference signal having a reference frequency to the downconverter 14, the correlation system 18, and the clock 20. The downconverter 14 amplifies the GPS signal with a low noise amplifier, phase locks a local oscillator signal to the reference signal, mixes the amplified GPS signal with the local oscillator signal to provide a GPS intermediate frequency (IF) signal, filters the GPS IF signal, and quantizes the filtered GPS IF signal from an analog form into a digital form. The quantized GPS IF signal has one or more bits of digital resolution in a single composite channel or in separate I and Q channels. The intermediate frequency may be in a range of a few Hertz to fifty megahertz and is preferably about one hundred kilohertz. The design of such downconverter 14 is well known to GPS and radio receiver engineers and does not form a novel part of the present invention. The downconverter 14 passes the GPS IF signal to the correlation system 18. The correlation system 18 uses the reference signal for sampling the GPS IF signal and as a time base for generating a GPS replica signal. The correlation system 18 correlates the GPS replica signal to the sampled GPS IF signal and passes information for the correlation in a correlation signal to the microprocessor system 24.

The clock 20 uses the reference signal as a time base for generating a time clock signal having a clock time in a digital form that is readable by the microprocessor system 24. When the GPS receiver 10 is in the operational mode providing location fixes the clock time is being continuous corrected by the microprocessor system 24 to match the GPS-based clock time.

The reference oscillator 16 and the clock 20 include internal batteries to enable them to continue to operate when the GPS receiver 10 is in the standby mode. In a preferred embodiment the GPS receiver 10 minimizes power consumption in the standby mode by inhibiting a flow of operating power to the antenna 12 and downconverter 14, inhibiting a flow of operating clocking signals in the correlator system 18, and/or inhibiting a flow of operating clocking signals in the microprocessor system 24. For inhibiting the flow of clock signals in the microprocessor system 25, the microprocessor 25 should be of a type known as a static microprocessor, such one of the Motorola CPU32 family. Such standby mode is disclosed in U.S. Pat. No. 5,592,173 by Lau, and U.S. Pat. Nos. 5,594,453 and 5,629,708 by Rodal et al. which are incorporated herein by reference. Because little or no power is consumed during the standby mode, such standby mode may be equivalent to being off in the observation of a human or electronic user.

When the GPS receiver 10 is turned on after being in a standby mode, the variable data 26 includes a last geographical location, a last three dimensional velocity, a clock time for the last position and last velocity, and almanac or ephemeris information for the locations-in-space of the GPS satellites as a function of clock time. The executable code 28 instructs the microprocessor system 24 for receiving the time clock signal and processing the clock time, the last location, the last velocity, and the almanac or ephemeris information to determine which of the GPS satellites are in the best locations-in-space relative to the GPS receiver 10 for acquisition the GPS satellite signal and determination of the geographical location fix. The executable code 28 then selects the pseudorandom noise (PRN) code or codes for the best GPS satellite or satellites and instructs the microprocessor system 24 for providing information for the selected PRN code or codes to the correlation system 18. The correlation system 18 uses the PRN code(s) for generating the GPS replica signal that is used for correlating to the GPS IF signal. The executable code 28 further instructs the microprocessor system 24 for calculating a phase and a frequency adjustment and for providing a feedback signal including information for the phase and frequency adjustment to the correlation system 18 to drive the phase and frequency of the GPS replica signal to correlate to the phase and frequency of the GPS IF signal. The GPS receiver 10 reacquires the GPS satellite signal by driving the correlation to a correlation threshold. When the correlation reaches the correlation threshold, the GPS receiver 10 is tracking the GPS satellite signal and can distinguish a transition of a state in a GPS data bit. However, the microprocessor system 24 cannot yet read the information in the GPS data bit because it does not yet know the position of the GPS data bit in the frame. Typically, the correlator system 18 has multiple channels to allow the microprocessor system 24 and correlator system 18 cooperate to track the GPS satellite signal from several GPS satellites in parallel.

The executable code 28 includes a data bit timer code 30 for determining when a time drift of the clock time during the period when the GPS receiver 10 was in standby mode is expected to be within a correction range of ten milliseconds of the GPS-based clock time. When the time drift is estimated to have been less than ten milliseconds, the data bit timer code 30 instructs the microprocessor system 24 for correcting the approximate internal clock time obtained from the clock 20 by using a time-of-arrival of a GPS data bit having a change of state as a synchronization standard. The data bit timer code 30 corrects the approximate internal clock time by aligning the internal clock time at the time-of-arrival to be the nearest multiple of twenty milliseconds of GPS-based clock time. For example, when the clock 20 indicates that the time of arrival is ZY hours, XW minutes, VU seconds, and T11 milliseconds where Z, Y, X, W, V, U, and T are arbitrary integers, then the internal clock time is corrected by plus nine milliseconds to be ZY hours, XW minutes, VU seconds, and T20 milliseconds. Preferably the data bit timer code 30 observes the GPS data bits from more than one GPS satellite in parallel in order to increase the likelihood of a change in state.

Preferably at turn on, the variable data 26 includes current information for the ephemeris location variables of the GPS satellites as a function of GPS-based clock time. Alternatively, the ephemeris location variables are received from another radio source or is read from the GPS data bits after finding a start of a subframe. The executable code 28 instructs the microprocessor system 24 for using the GPS-based clock time and the ephemeris location variables for finding the precise locations-in-space for four or more GPS satellites and pseudoranges from the GPS antenna 12 to the GPS satellites. Fewer than four are required if some other information such as altitude is available. Once the locations-in-space of the GPS satellites and pseudoranges are determined, the executable code 28 instructs the microprocessor system 24 for solving simultaneous equations for determining the first and subsequent geographical location fixes of the GPS antenna 12. The microprocessor system 24 provides the first and subsequent geographical location fixes in a GPS location fix signal.

The GPS receiver 10 typically has an internal temperature rise in a range of 10° to 20° C. when it has been operating continuously relative to an internal temperature when it has been in a standby mode for half an hour or more depending upon the thermal resistance and thermal time constant of the enclosure. In order to reduce the overall cost of the GPS receiver 10, the reference oscillator 16 is an inexpensive crystal oscillator (XO) having a frequency drift of its reference frequency in a range of about five to ten parts per million when the GPS receiver 10 that has been operating continuously cools down after switching to the standby mode. Used as a time base for the clock 20, the frequency drift results in a time drift that can be expected to be less than ten milliseconds for a standby mode time duration of approximately fifteen minutes to an hour. Although fifteen minutes to an hour is sufficient for many applications a longer standby time duration is sometimes necessary or unavoidable. Several elements are disclosed below for improving TTFF by estimating and compensating for the time drift for providing a longer standby time duration.

The GPS receiver 10 includes a temperature sensor 32 connected to reference oscillator 16 to measure a temperature and provide a corresponding temperature signal readable by the microprocessor system 24. The executable code 28 includes a pre-determined table and/or equations for a frequency/temperature characteristic 34 relating the reference frequency to a temperature of the reference oscillator 16. The executable code 28 further includes a temperature compensation code 36 to instruct the microprocessor system 24 to read the temperature signal for a temperature and the time clock signal for a corresponding clock time when the GPS receiver 10 is operating and providing a location fix. When the GPS receiver 10 is about to enter standby mode, the temperature compensation code 36 instructs the microprocessor system 24 to store a first temperature and a first clock time in the variable data 26. When the GPS receiver 10 is turned on again and begins tracking the GPS satellite signal the temperature compensation code 36 instructs the microprocessor system 24 for reading a second temperature and a corresponding second clock time and for estimating the frequency drift from the first and second temperatures and the frequency/temperature characteristic 34. The temperature compensation code 36 further instructs the microprocessor system 24 for using the frequency drift and the difference between the first and second clock times for estimating the time drift of the clock time.

The temperature compensation code 36 optionally instructs the microprocessor system 24 for using the frequency adjustment that causes the correlation signal to reach the correlation threshold for determining the reference frequency, whereby a frequency of the GPS IF signal is used as a frequency standard, and reading the temperature signal at various times when the GPS receiver 10 is tracking the GPS satellite signal. The reference frequencies and associated temperatures are used to create and store a new frequency/temperature characteristic 34' in the variable data 26. The frequency/temperature characteristic 34 may be used as a default or a basis for the new frequency/temperature characteristic 34'.

The variable data 26 includes a learned time correction 38 having information for a time correction that was used for correcting the time clock after a previous cycle where the GPS receiver 10 was turned on after being standby mode. The executable code 28 includes a learned time adjustment code 40 for instructing the microprocessor system 24 for alternating GPS receiver 10 between the low power standby mode for a selected time duration and an operating mode. In the operating mode the GPS receiver 10 determines and provides a GPS-based geographical location fix. Each time the GPS receiver 10 reacquires and begins tracking the GPS satellite signal after a standby mode, the approximate internal clock time provided by the clock 20 is corrected by the data bit timer code 30 to match the GPS-based clock time, the learned time adjustment code 40 calculates a new weighted average of the learned time correction 38 by multiplying the previous weighted average by a factor, k, and adding the most recent correction multiplied by a factor, 1-k, where $0 \leq k \leq 1$. When the GPS receiver 10 is turned on and begins tracking the GPS satellite signal, the learned time adjustment code 40 estimates the time drift in the clock time from the learned time correction 38 and instructs the microprocessor system 24 for adjusting the clock time to compensate.

The learned time adjustment code 40 optionally instructs the microprocessor system 24 for determining a time duration for a standby mode by reading the first clock time when the GPS receiver 10 is about to enter standby mode and the second clock time when the GPS receiver 10 is turned on and begins tracking the GPS satellite signal. The time corrections and the associated time durations are related in an equation and/or a table and stored in the learned time correction 38. When the GPS receiver 10 is turned on and begins tracking the GPS satellite signal, the learned time adjustment code 40 determines a new time duration for a standby mode and uses the new time duration for estimating the time drift from the equation or by interpolating in the table.

FIG. 2a is a curve referred to by the general reference number 50 for illustrating the frequency/temperature characteristic 34 and/or 34' for the typical reference oscillator 16. The vertical axis is for variation in the reference frequency divided by the nominal frequency, Δf/f, in units of parts per million (ppm). The horizontal axis is for temperature of the reference oscillator 16 in degrees Centigrade (°C.). The curve 50 shows the frequency/temperature characteristic 34 and/or 34' having a lower minimum point 51 at approximately −40° C., −7.5 ppm, a lower maximum point 52 at approximately −8° C., +6.1 ppm, a mid point 53 at approximately +24° C., 0 ppm, an upper minimum point 54 at approximately +61° C., −7.9 ppm, and an upper maximum point 55 at approximately +85° C., −1.6 ppm. The minimum and maximum excursions 51, 52, 53, and 54 of the curve 50 may be smaller or larger depending upon the quality of the type and/or individual reference oscillator 16.

FIG. 2b is a table illustrating the frequency/temperature characteristic 34 and/or 34' for the reference oscillator 16 in a numerical format corresponding to the curve 50. The table shows the temperature in degrees Centigrade and the relative frequency in parts per million (ppm) associated with the temperature for the typical reference oscillator 16.

Figure 3A:
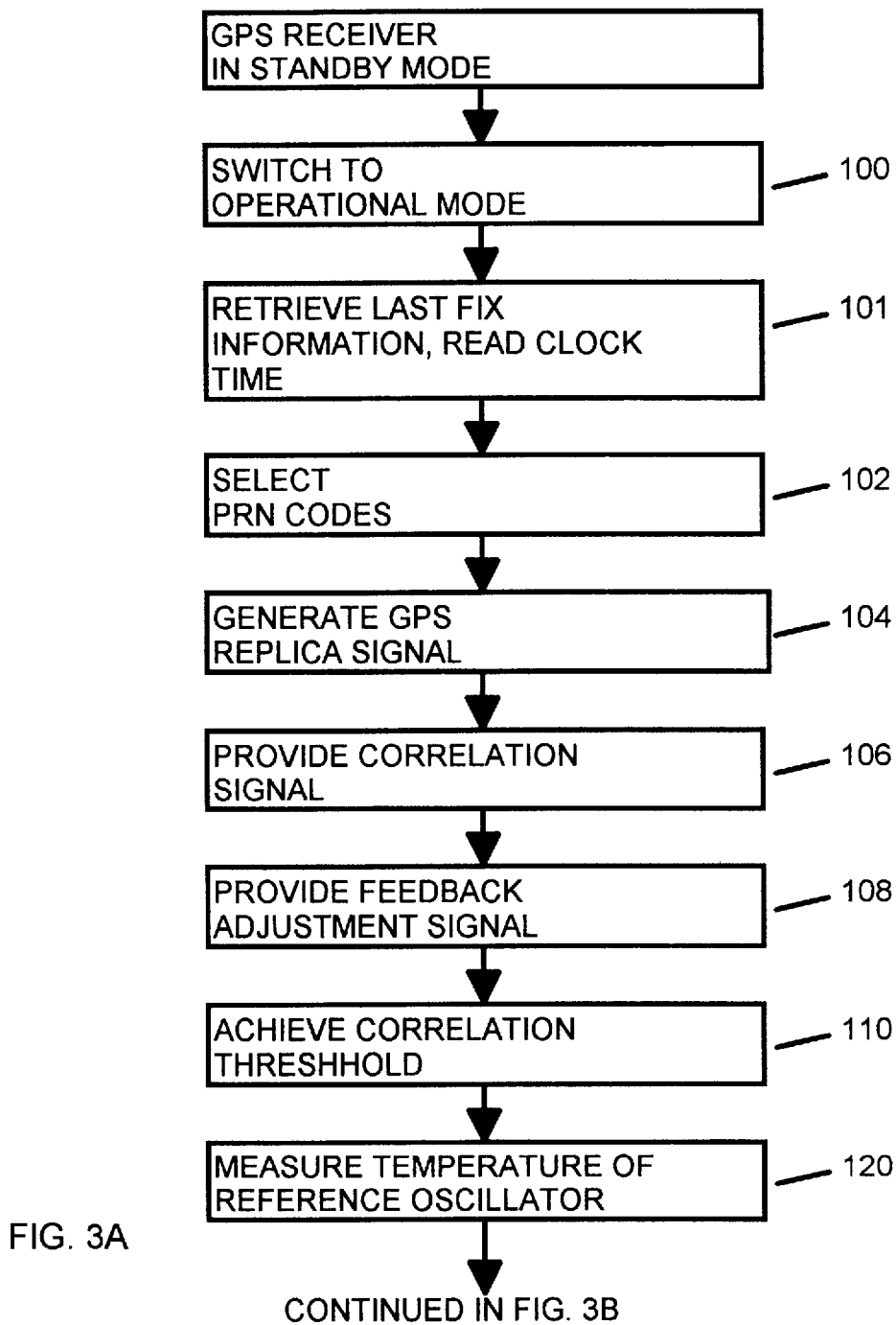
FIGS. 3a, 3b, and 3c are a flow chart of a method in the GPS receiver of FIG. 1 for receiving a GPS satellite signal and providing a geographical location fix.
Figure 3B:
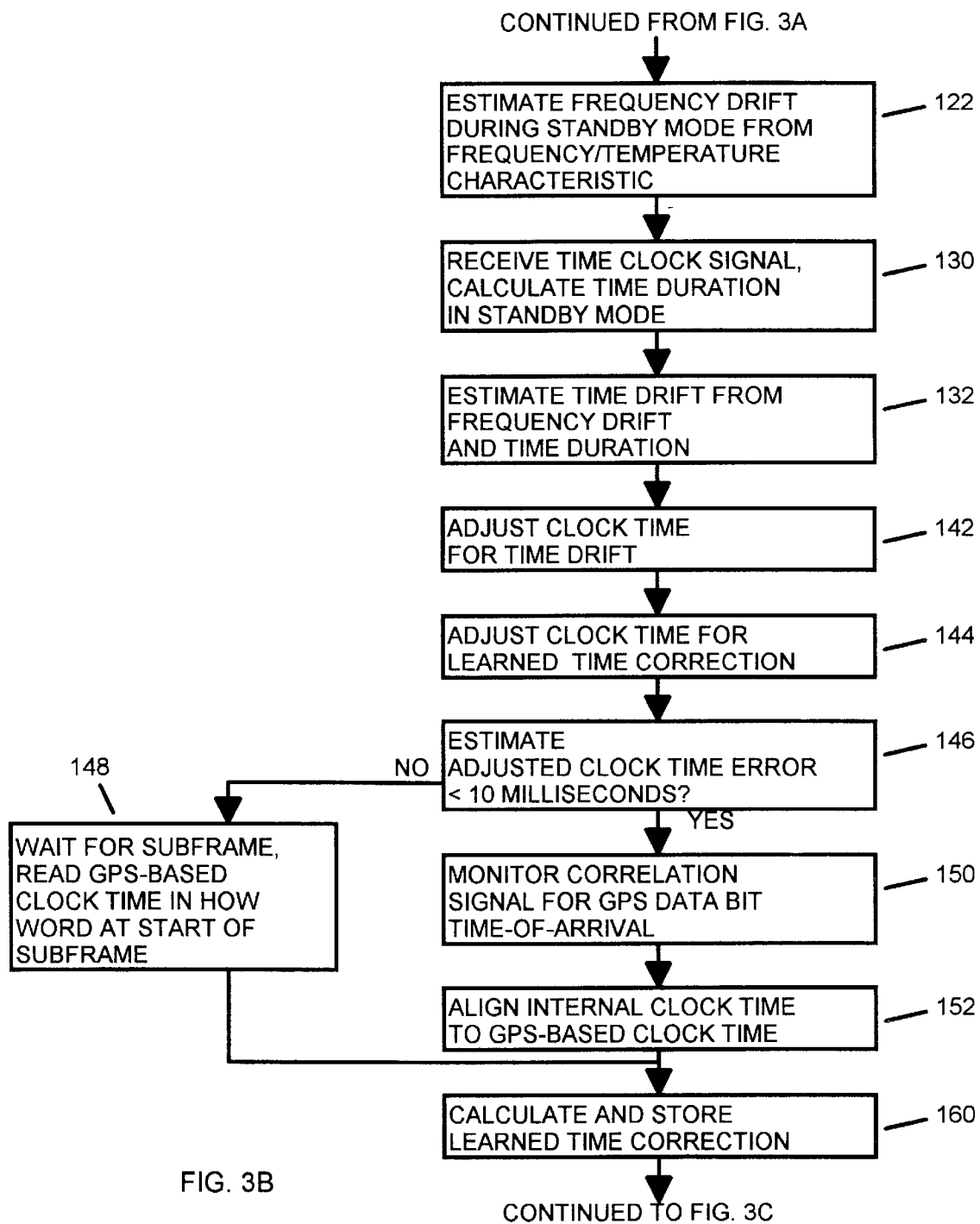
Figure 3C:
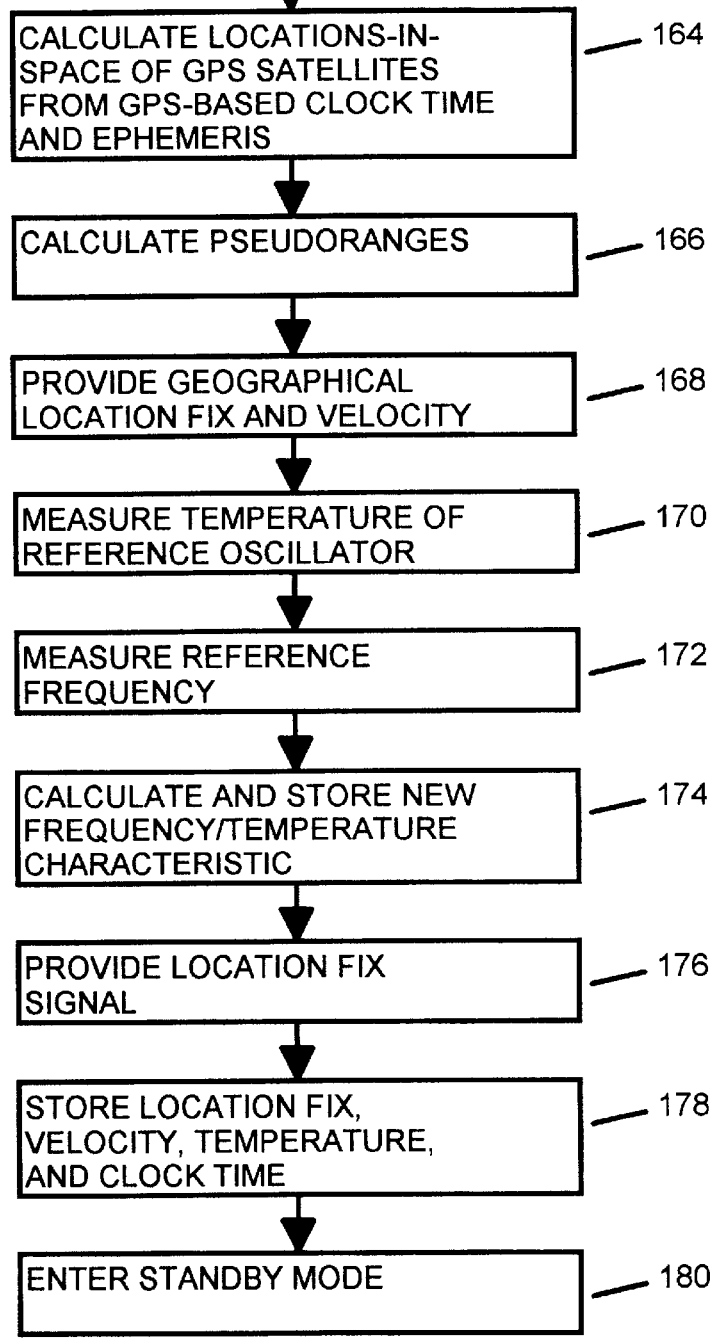

FIGS. 3a, 3b, and 3c are a flow chart of a method in the GPS receiver 10 for finding the first geographical location fix after being in the standby mode. At the start the GPS receiver 10 is in the standby mode. The variable data 26 retains the last fix information for the last GPS-based clock time, the last geographical location and last three dimensional velocity for the GPS receiver 10, the last temperature of the reference oscillator 16, and the last ephemeris location variables for the GPS satellites. The clock 20 continues to track the clock time internally using the reference signal from the reference oscillator 16 as a time base. However, during the time duration in the standby mode the internal clock time has drifted as compared to the GPS-based clock time.

At a step 100 the GPS receiver 10 is switched to the operational mode. At a step 101 the microprocessor system 24 retrieves the last fix information from the variable data 26 and reads the internal clock time from the clock 20. At a step 102 the microprocessor system 24 uses the retrieved information for selecting the PRN code or codes for acquiring the GPS satellite signal. At a step 104 the correlation system 18 receives the PRN code information and the reference signal from the reference oscillator 16 and generates the GPS replica signal for the selected PRN codes using the reference frequency as a time base. At a step 106 the correlation system 18 receives the GPS IF signal and provides a correlation signal for the correlation of the GPS IF signal and the GPS replica signal. At a step 108 the microprocessor system 24 provides the feedback adjustment signal to drive the phase and frequency of the GPS replica signal to correlate to the GPS IF signal. At a step 110 the correlation of the GPS replica signal and the GPS IF signal achieves the correlation threshold.

At a step 120 the temperature compensation code 36 instructs the microprocessor system 24 to measure a new temperature of the reference oscillator 16 by reading the temperature signal from the temperature sensor 32. At a step 122 the temperature compensation code 36 instructs the microprocessor system 24 for using the frequency/temperature characteristic 34 or 34', the new temperature, and the difference between the new and the last temperature for calculating the frequency drift of the reference oscillator 16 during the standby mode. As an example using the table in the FIG. 2b, assume the last temperature was 30° C. and the new temperature is 25° C. The relative frequency corresponding to 30° C. is −1.8 ppm and the relative frequency corresponding to 25° C. is −0.3 ppm so the frequency drift in ppm is estimated at +1.5 ppm. Linear interpolation is used when a measured temperature is not identical to a temperature included in the table.

At a step 130 the temperature compensation code 36 instructs the microprocessor system 24 to receive the time clock signal from the clock 20 and to calculate the time duration for the standby mode from the difference between the new and the last clock times. At a step 132 the temperature compensation code 36 instructs the microprocessor system 24 to estimate the time drift of the internal clock time from the frequency drift and the time duration. In a preferred embodiment, the temperature compensation code 36 uses an equation 1, shown below, for estimating the time drift as a function of frequency drift and time duration.

$$\Delta t = \frac{\Delta fxt}{2} \Big|_{0 \le t \le T} + \Delta fx(t-T)\Big|_{T<t} \qquad (1)$$

The equation 1 shows the time drift Δt in microseconds equals one half the frequency drift Δf in parts per million (ppm) times the time duration t in the standby mode in seconds for the time duration t between zero and a certain time T in seconds, plus the frequency drift Δf times the quantity of time duration t minus the certain time T for the time duration t greater than the certain time T. The certain time T depends upon the time constant of the internal temperature cooling of the GPS receiver 10 after the GPS receiver 10 enters the standby mode. In a preferred embodiment of the GPS receiver 10 the certain time T is about twelve hundred seconds. For the frequency drift Δf of 1.5 ppm in the example above and a time duration t of one hour, the time drift Δt is four and one-half milliseconds. Optionally, a more precise equation using an exponential decay may be used for estimating time drift as a function of frequency drift and time duration.

At a step 142 the temperature compensation code 36 instructs the microprocessor system 24 to adjust the internal clock time to compensate for the estimate of the time drift. At a step 144 the learned time adjustment code 40 uses the learned time correction 38 stored in variable data 26 to adjust the internal clock time for the time correction that was used for aligning the internal clock time to the GPS-based clock time when the GPS receiver 10 entered a previous operational mode after a standby mode. At a step 146 the data bit timer code 30 estimates when the adjusted internal time clock is likely to have a time error of less than ten milliseconds relative to the GPS-based clock time. In a preferred embodiment the data bit timer code 30 assumes that the time error is less than ten milliseconds when the time drift estimated by the temperature compensation code 36 and the time adjustment by the learned time adjustment code 40 is less than about one hundred milliseconds and the time duration of the standby mode is less than about forty-eight hours. When the time error is not assumed to be less than ten milliseconds the data bit timer code 30 instructs the microprocessor system 24 to go to a step 148 to monitor the GPS data bits in the correlation signal until the start of a subframe is recognized, read the GPS-based clock time in a hand over word (HOW) in the subframe, and align the internal clock time to the GPS-based clock time in the conventional manner.

At a step 150 when the time drift and/or learned adjustment is determined to be less than ten milliseconds, the data bit timer code 30 instructs the microprocessor system 24 to monitor the correlation signal from the correlator 18 until a transition of state of a GPS data bit is detected. Preferably the correlation signal has correlation information corresponding to more than one GPS satellite, thereby enabling the microprocessor system 24 to note the time-of arrival of a GPS data bit from more than one GPS satellite. At a step 152 the data bit timer code 30 instructs the microprocessor system 24 to synchronize to the time-of-arrival of the GPS data bit and align the internal clock time to the nearest twenty millisecond increment of the GPS-based clock time.

At a step 160 the learned time adjustment code 40 instructs the microprocessor system 24 for calculating a new learned time correction 38 to be used after the next standby mode. The learned time correction 38 most useful when the GPS receiver 10 is caused to alternate between the standby mode for a selected time duration and the operational mode for providing a geographical location fix.

In a preferred embodiment the learned time adjustment code 40 uses a moving average for merging the most recent time adjustment used in the alignment of the internal clock time with the previously stored learned time correction 38 using a weighting factor k according to an equation 2, below.

$$\nabla t_n = k \times \nabla t + (1-k) \times \nabla t_p \qquad (2)$$

The equation 2 shows the new learned time correction 38 ($\nabla t_n$) equals the weighting factor k times the most recent time adjustment $\nabla t$ plus the quantity one minus the weighting factor k times the previously stored learned time correction 38 ($\nabla t_p$). In a preferred embodiment the weighting factor k is equal to one-tenth. As a further option the standby mode may be caused to have a variable time duration. The learned time correction 38 may include information for several time durations associated with several weighted averages $\nabla t_{p1}, \nabla t_{p2} \ldots \nabla t_{pm}$. Interpolation may be used to calculate the time adjustment in the step 144 when the time duration does not match any of the time durations until a new weighted average $\nabla t_{pm+1}$ is learned. After a few cycles between the operational mode and the standby mode the learned time adjustment code 40 learns an average time adjustment that is necessary to align the adjusted internal clock time to the GPS-based clock time for use in adjusting the internal clock time after the next standby mode and stores information for the average time adjustment in the variable data 26 as the learned time correction 38.

At a step 164 the microprocessor system 24 calculates locations-in-space for at least four GPS satellites from the ephemeris location variables and the GPS-based clock time. At a step 166 the microprocessor system 24 calculates the pseudoranges from the GPS antenna 12 to the GPS satellites. At a step 168 the microprocessor system 24 uses the pseudoranges to determine and provide the geographical location fix and velocity of the GPS antenna 12.

Optionally, in a step 170 the temperature compensation code 36 instructs the microprocessor system 24 to read the temperature signal from the temperature sensor 32 to measure the temperature of the reference oscillator 16. In a step 172 the temperature compensation code 36 instructs the microprocessor system 24 to measure the reference frequency from the frequency adjustment feedback that is required for the correlation threshold after accounting for Doppler frequency shifts of the GPS satellite and the GPS antenna 12. The steps 170 and 172 are performed nearly simultaneously in order that the measured temperature corresponds as closely as possible to the temperature of the reference oscillator 16 when the reference frequency is being measured. In a step 174 the temperature compensation code 36 instructs the microprocessor system 24 for using the reference frequency and the associated temperature for creating and storing a new frequency/temperature characteristic 34' in the variable data 26. The steps 170, 172, and 174 may be repeated several times at different temperatures in order to cover the temperature range at which the reference oscillator 16 operates.

In a step 176 the microprocessor system 24 provides the GPS-based geographical location in the GPS location fix signal. When information for a GPS-based time is included in the GPS location fix signal, the GPS-based clock time is corrected for the distance between the location of the GPS antenna 12 and the GPS satellite. In a step 178 the microprocessor system stores the geographical location fix, velocity, temperature, clock time, and the ephemerides in the variable data 26. In a step 180 the GPS receiver 10 switches to the standby mode.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A global positioning system (GPS) receiver for receiving a GPS satellite signal including a GPS data bit having a time-of-arrival synchronized to a GPS-based clock time, comprising:

a correlation system for receiving a GPS signal representative of said GPS satellite signal and providing a correlation signal including information for said time-of-arrival of said GPS data bit;

a local clock for providing a time clock signal including an internal clock time;

a microprocessor system coupled to the correlation system for receiving said correlation signal and coupled to the clock for receiving said time clock signal; and a data bit timer code for inclusion in the microprocessor system including instructions for instructing the microprocessor system for synchronizing said internal clock time to said time-of-arrival of said GPS data bit for determining said GPS-based clock time.

2. The GPS receiver of claim 1, wherein:

the correlation system is further for receiving said GPS signal from two or more GPS satellites; and the data bit timer code further includes instructions for synchronizing to said time-of-arrival of said GPS data bit from any one of said GPS satellites.

3. The GPS receiver of claim 1, further including:

a compensation/adjustment code for inclusion in the microprocessor system including instructions for computing an estimated time drift of said internal clock time that has occurred during a standby mode and adjusting said internal clock time to an adjusted clock time to compensate for said estimated time drift, said adjusted clock time for use by the data bit timer code for synchronizing to said time-of-arrival of said GPS data bit.

4. The GPS receiver of claim 3, wherein:

the compensation/adjustment code includes a temperature compensation code including instructions for instructing the microprocessor system for computing said estimated time drift due to a change in temperature.

5. The GPS receiver of claim 4, further including:

a reference oscillator for providing a reference signal having a reference frequency to the clock for use as a time-base, the reference oscillator having a temperature;

a temperature sensor coupled to the reference oscillator for measuring said temperature and providing a temperature signal including information for said temperature to the microprocessor system;

a frequency/temperature characteristic for inclusion in the microprocessor system relating said reference frequency and said temperature; and wherein said temperature compensation code is further for using said temperature and the frequency/temperature characteristic for computing said estimated time drift.

6. The GPS receiver of claim 5, wherein:

said temperature compensation code is further for using a frequency of the GPS signal as a standard for measuring said reference frequency and using said reference frequency and said temperature for computing the frequency/temperature characteristic.

7. The GPS receiver of claim 3, further including:

a learned time correction for inclusion in the microprocessor system, the learned time correction based upon a previous difference between said internal clock time and said GPS-based clock time; and wherein:

the compensation/adjustment code includes a learned time adjustment code for computing said previous difference and using the learned time correction for computing said estimated time drift.

8. The GPS receiver of claim 7, wherein:

said learned time adjustment code is further for calculating said learned time correction based upon a weighted average of two or more of said previous difference after several cycles between said standby mode and an operational mode.

9. The GPS receiver of claim 7, wherein:

said learned time adjustment code is further for measuring a time duration of said standby mode and calculating said time drift based upon the learned time correction and said time duration.

10. A method in a global positioning system (GPS) receiver for receiving a GPS satellite signal having a GPS data bit having a time-of-arrival synchronized to a GPS-based clock time, comprising steps of:

providing an internal clock time in a time clock signal from a local clock;

correlating to a GPS signal representative of said GPS satellite signal for providing a correlation signal having information for said time-of-arrival of said GPS data bit; and aligning said internal clock time to GPS-based clock time by synchronizing to said time-of-arrival of said GPS data bit.

11. The method of claim 10, wherein:

the step of correlating to a GPS signal further includes a step of providing a correlation for a GPS signal from two or more GPS satellites, said correlation signal having information for said time-of-arrival from each of said GPS satellites.

12. The method of claim 10, further including steps of:

computing an estimated time drift of said internal clock time that has occurred during a standby mode;

adjusting said internal clock time to compensate for said time drift when the GPS receiver; and wherein:

the step of aligning said internal clock time includes aligning said adjusted internal clock time for synchronizing to said time-of-arrival.

13. The method of claim 12, further including steps of:

providing a reference signal having a reference frequency for use as a time base for said internal clock time, said reference frequency dependent upon a temperature;

providing a frequency/temperature characteristic relating said reference frequency to said temperature;

measuring a first said temperature when said GPS receiver is about to enter said standby mode;

measuring a second said temperature after a time duration in said standby mode;

estimating a frequency drift in said reference frequency from said first temperature, said second temperature, and said frequency/temperature characteristic; and wherein:

the step of computing said estimated time drift includes a step of estimating said estimated time drift from said frequency drift.

14. The method of claim 13, further including steps of:

measuring said reference frequency using a frequency of said GPS satellite signal as a standard;

measuring said temperature for said reference frequency; and creating said frequency/temperature characteristic from two or more of said reference frequency and two or more of said temperature.

15. The method of claim 12, further including a step of:

calculating a learned time correction from a difference between said internal clock time and said GPS-based clock; and wherein:

the step of computing said estimated time drift includes a step of estimating said estimated time drift based upon said learned time correction.

16. The method of claim 15, further including steps of:

measuring a time duration of said standby mode; and wherein:

the step of computing said estimated time drift further includes a step of estimating said estimated time drift based upon said learned time correction and said time duration.

* * * * *